United States Patent [19]
Noda

[11] Patent Number: 5,736,837
[45] Date of Patent: Apr. 7, 1998

[54] BATTERY CHARGING DEVICE FOR BATTERY DRIVEN TOOL

[75] Inventor: Ariya Noda, Anjo, Japan

[73] Assignee: Makita Corporation, Anjo, Japan

[21] Appl. No.: 784,771

[22] Filed: Jan. 16, 1997

[30] Foreign Application Priority Data

Jan. 18, 1996 [JP] Japan ................. 8-006247
Jul. 25, 1996 [JP] Japan ................. 8-196449

[51] Int. Cl.⁶ ............................... H01M 10/46
[52] U.S. Cl. ............... 320/104; 320/111; 439/133
[58] Field of Search ................. 320/2, 5, 104, 320/111, 101; 56/10.8, 17.5; 439/133

[56] References Cited

U.S. PATENT DOCUMENTS

| | | | |
|---|---|---|---|
| 4,913,984 | 4/1990 | Shimizu | 429/97 |
| 4,956,983 | 9/1990 | Okamura et al. | 70/241 |
| 5,085,043 | 2/1992 | Hess et al. | 320/2 X |
| 5,293,143 | 3/1994 | Sakakino et al. | 335/186 |
| 5,301,494 | 4/1994 | Peot et al. | 320/2 X |
| 5,432,387 | 7/1995 | Kogure et al. | 307/328 |
| 5,627,448 | 5/1997 | Okada et al. | 320/2 |

*Primary Examiner*—Edward Tso
*Attorney, Agent, or Firm*—Dennison, Meserole, Pollack & Scheiner

[57] ABSTRACT

A battery charging device for use with a battery driven tool has a power source circuit and an interlock switch provided in the power source circuit. The battery charging device includes an operation panel having an operation key insertion opening and a charging plug insertion opening formed therein. A slide plate is movable relative to the operation panel between an ON position for turning on the interlock switch and for substantially closing the charging plug insertion opening, and an OFF position for turning off the interlock switch and for substantially opening the charging plug insertion opening. An operation key is adapted to be connected to the slide plate by means of a connecting mechanism. The operation key is permitted to be connected to the slide plate through the operation key insertion opening by means of the connecting mechanism when the slide plate is in the OFF position.

12 Claims, 8 Drawing Sheets

5,736,837

BATTERY CHARGING DEVICE FOR BATTERY DRIVEN TOOL

BACKGROUND OF THE INVENTION

1. Field of the Invention

The present invention relates to a battery charging device for use with a battery driven tool such as a lawn mower, and particularly to a battery charging device having a power source circuit with an interlock switch provided in the power source circuit.

2. Description of the Prior Art

U.S. Pat. No. 5,085,043 discloses a battery charging device for use with a battery driven tool. The battery charging device includes an interlock switch provided in a power source circuit for preventing the power source circuit from malfunction when charging a battery. When an operation key is inserted into a key insertion opening provided in the battery charging device, the interlock switch is turned on to provide a connecting state of the power source circuit, so that the battery driven tool can be driven. When the operation key is removed from the battery charging device, the power source circuit is brought to a disconnecting condition, so that the battery driven tool cannot be driven and a charger plug can be connected to the battery charging device for charging the battery.

However, with the conventional battery charging device, when the operation key is removed from the key insertion opening for charging the battery, the key insertion opening remains open to the outside. Therefore, external materials may enter the interior of the battery charging device through the key insertion opening, with the result that the operation key cannot be properly inserted and that the interlock switch operation mechanism cannot be properly operated. These problems may also be caused when the battery driven tool is not used or when the tool is stored in a storing place since, in such an occasion, the operation key is removed from the battery charging device for preventing malfunction of the device.

In addition, since the key insertion opening is open while the battery is charged or when the tool is not used, the power source circuit may easily be brought to the connecting state if a bar-like member is accidentally inserted into the key insertion opening by a child or other person.

Further, with the conventional device, a rib is formed with the operation key for preventing the operation key from being removed from the device when vibrations are produced in the tool during the operation of the tool. However, the rib may not sufficiently function to prevent the operation key from being removed and the power source circuit may accidentally be brought to the disconnecting condition when the vibrations produced in the tool are of great magnitude.

SUMMARY OF THE INVENTION

It is, accordingly, an object of the present invention to provide a battery charging device adapted for use with a battery driven tool and having an operation key insertion opening which is prevented from being open to the outside while the battery is charged or when the tool is in a storing place.

It is another object of the present invention to provide a battery charging device adapted for use with a battery driven tool which can reliably prevent an operation key from being accidentally removed during the operation of the battery driven tool.

According to the present invention, there is provided a battery charging device adapted for use with a battery driven tool having a power source circuit and an interlock switch provided in the power source circuit, comprising:

an operation panel having an operation key insertion opening and a charging plug insertion opening formed therein;

a slide plate movable relative to the operation panel between an ON position for turning on the interlock switch and for substantially closing the charging plug insertion opening, and an OFF position for turning off the interlock switch and for substantially opening the charging plug insertion opening; and an operation key for connection to the slide plate by connecting mechanism;

the operation key being permitted to be connected to the slide plate through the operation key insertion opening by means of the connecting mechanism when the slide plate is in the OFF position.

With this construction, when the slide plate is moved from the OFF position to the ON position, the charging plug insertion opening is closed and the interlock switch is turned on, so that the power source circuit is brought to a connecting state and the battery driven tool can be operated. On the other hand, when the slide plate is moved from the ON position to the OFF position, the interlock switch is turned off, so that the power source circuit is brought to a disconnecting state and the battery driven tool cannot be operated. In addition, the charging plug insertion opening is opened, so that a charging operation of the battery can be performed.

Thus, the turning of the power source circuit between the connecting state and the disconnecting state as well as the switching of the charging plug insertion opening between a closed state and an open state can be performed by moving the slide plate by means of the operation key. Therefore, the power source circuit may not be brought to the connecting condition through operation for connecting the operation key to the slide plate but may be brought to the connecting condition only when the slide plate is moved to the ON position. For this reason, the power source circuit may not be brought to the connecting state even if a child or other person has accidentally inserted a bar-like member into the operation key insertion opening. This may reliably prevent any malfunction of the tool.

In addition, since the operation key insertion opening of the operation panel is substantially closed by the slide plate, any external materials may not enter the interior of the battery charging device, so that the battery charging device or the tool may not cause any trouble such as an improper operation.

The battery charging device includes a lock mechanism for preventing the operation key from being removed from the slide plate when the slide plate is moved from the OFF position to the ON position with the operation key being connected to the slide plate.

With this construction, the connecting state of the power source circuit can be reliably maintained even if vibrations of great amplitude have been produced in the tool.

The operation panel includes a front plate having the operation key insertion opening and the charging plug insertion opening, and the slide plate may be slidably movable along an inner surface of the front plate.

The connecting mechanism may include an engaging hole formed in the slide plate for engaging one end of the operation key in a direction perpendicular to a sliding direction of the slide plate.

One end of the operation key includes a leg extending inwardly of the slide plate when that one end is in engagement with the engaging hole, so that the leg is operable to turn the interlock switch on.

The lock mechanism includes a lock opening formed in the operation key and a lock protrusion formed on the operation panel, so that the lock protrusion is received by the lock opening when the slide plate is moved from the OFF position to the ON position.

Otherwise, the lock mechanism may include a lock protrusion formed on the operation key and a guide edge formed on the operation panel, so that the lock protrusion is held between the operation panel and the slide plate when the slide plate is moved from the OFF position to the ON position.

The operation panel may include a lid for normally closing the charging plug insertion opening.

DETAILED DESCRIPTION OF THE PREFERRED EMBODIMENTS

Figure 1:
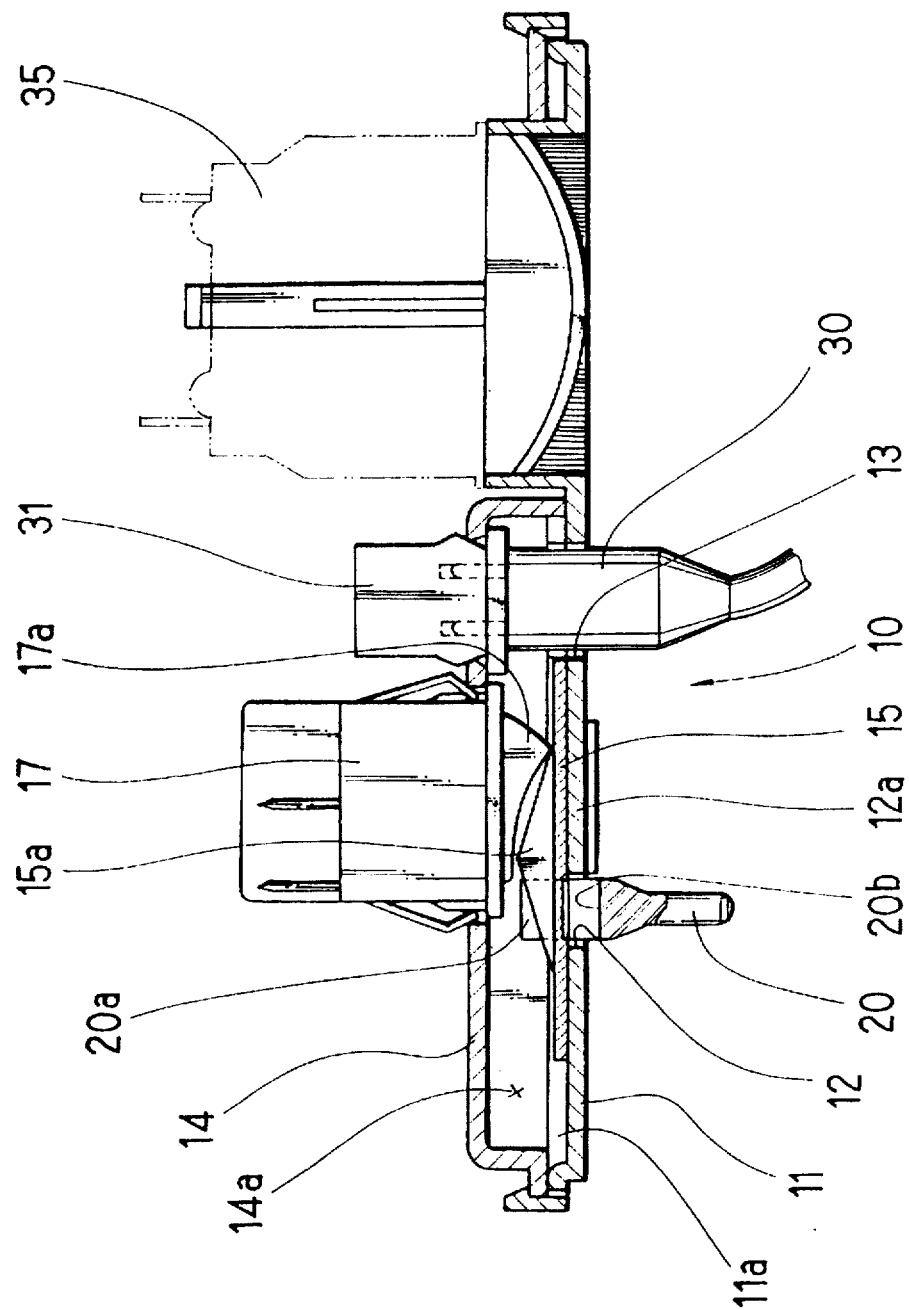
FIG. 1 is a horizontal sectional view of a battery charging device in a disconnecting state according to a first embodiment of the present invention.

A first embodiment of the present invention will now be explained with reference to FIGS. 1 to 8. A lawn mower as an example of a battery driven tool is shown in FIG. 7 and includes a body 1 having wheels 1a and a handle 2. The handle 2 extends rearwardly from the body 1 and is adapted to be grasped by both hands of an operator. portion of the body 1 and is driven by a motor M. The motor M is controlled to be started and stopped by a power source circuit C shown in FIG. 8. An operation lever 4 is mounted on the handle 2 in a position adjacent the rear end of the handle 2. When the operation lever 4 is moved to the ON position, an operation switch 16 provided in the power source circuit C is turned on, so that the motor M is started. A box 3 is mounted on a rear portion of the body 1 for collecting the lawn which has been cut by the rotary cutter.

A battery charging device 10 is mounted on the rear upper portion of the body 1 and is positioned to confront the operator (in a direction indicated by an arrow D in FIG. 7).

The construction of the battery charging device 10 will now be explained with reference to FIGS. 1 to 5. The battery charging device 10 has a front plate 11 and a holder plate 14 which cooperate to form an operation panel. The front plate 11 includes an operation key insertion opening 12 and a charging plug insertion opening 13 formed therein. As will be best seen from FIG. 2, the key insertion opening 12 has a substantially U-shaped configuration which is formed by cutting out the front plate 11. A lock protrusion 12a having a flat plate-like configuration and having a predetermined width is formed with the front plate 11 and extends into the key insertion opening 12 from the right side as viewed in FIG. 2. The charging plug insertion hole 13 is positioned rightwardly of the key insertion opening 12 as viewed in FIG. 2 and has a circular configuration for receiving a charging plug 30.

A flat plate-like slide plate 15 is positioned inside of the front plate 11 and extends in parallel relationship with the front plate 11. The slide plate 15 has both lateral edges slidably received within a pair of guide recesses 11a (see FIG. 5) formed on both lateral sides of the front plate 11, so that the slide plate 15 can be slidably moved along the front plate 11 in right and left direction as viewed in FIG. 2.

Figure 2:
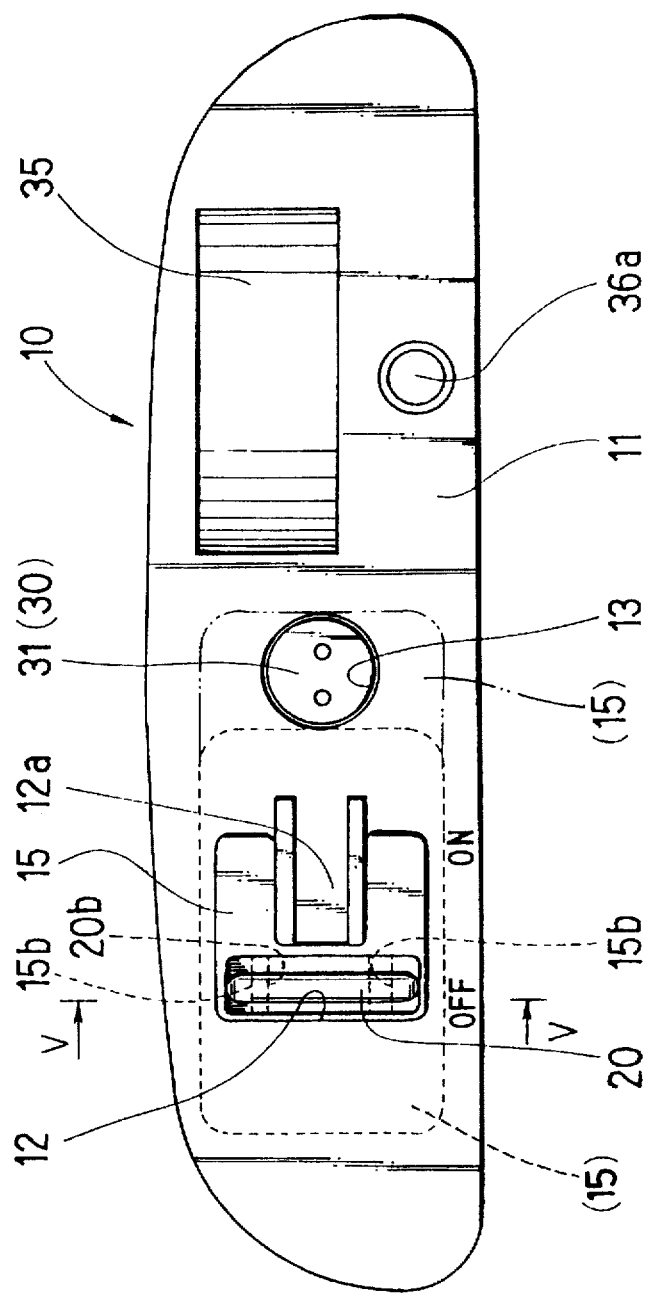
FIG. 2 is a front view of the battery charging device in the disconnecting state as viewed in a direction of an arrow D in FIG. 7.
Figure 3:
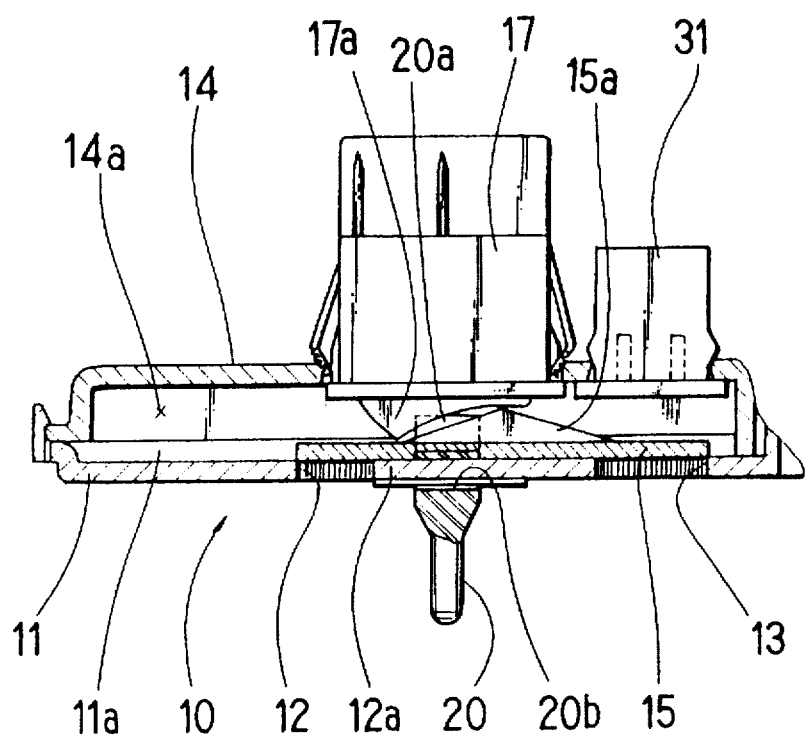
FIG. 3 is a sectional view of a part of the battery charging device in a connecting state.
Figure 4:
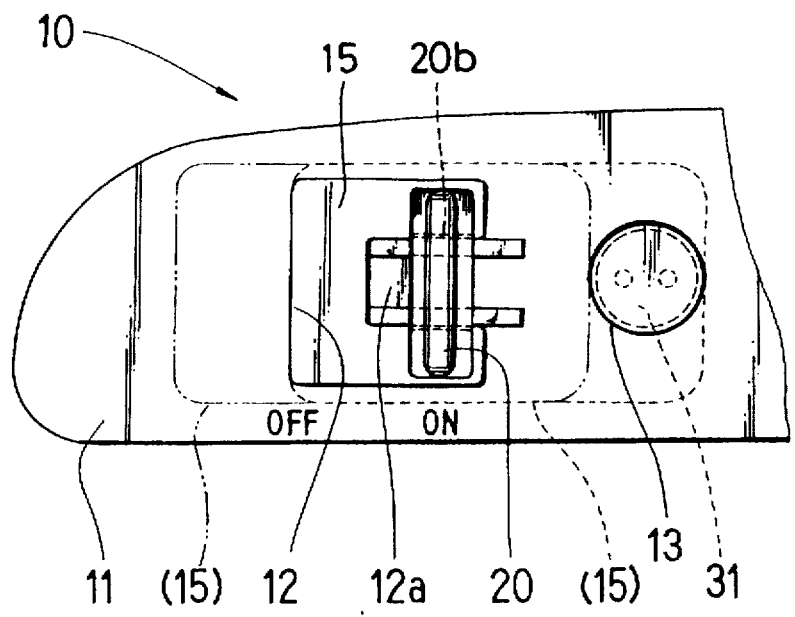
FIG. 4 is a front view of a part of the battery charging device in the connecting state.

The area (or length in the sliding direction) of the slide plate 15 is determined such that both the operation key insertion opening 12 and the charging plug insertion opening 13 of the front plate 11 can be simultaneously closed by the slide plate 15. More specifically, when the slide plate 15 is in a leftmost position (hereinafter called "OFF position") as viewed in FIG. 2, the charging plug insertion opening 13 is open. On the other hand, when the slide plate 15 is in a rightmost position (hereinafter called "ON position") as viewed in FIG. 2, the charging plug insertion opening 13 is closed by the slide plate 15. The slide plate 15 in the OFF position is shown in FIGS. 1 and 2, while the slide plate 15 in the ON position is shown in FIGS. 3 and 4.

The slide plate 15 configuration will now be explained in detail with reference to FIGS. 6(A) to 6(D). The slide plate 15 has a central protrusion 15a formed centrally of the inner surface thereof. The central protrusion 15a has a triangular configuration, so that a pair of inclined surfaces are formed on both sides in the sliding direction. The central protrusion 15a is moved in the sliding direction with the slide plate 15 and serves to turn an interlock switch 17 on and off.

The interlock switch 17 is an element of the power source circuit C and serves to provide a connecting state and a disconnecting state of the power source circuit C. The interlock switch 17 is mounted on the holder plate 14 which is joined to the front plate 11 on the inner side thereof. As shown in FIG. 1, the holder plate 14 has a left side part which forms a recess 14a confronting the operation key insertion opening 12 and the charging plug insertion opening 13 of the front plate 11, so that a predetermined gap is provided between the front plate 11 and the holder plate 14. The interlock switch 17 has an operation member 17a which extends into the space between the operation plate 11 and the holder plate 14 and which is pivotable in right and left directions for turning the interlock switch 17 on and off.

With this construction, when the slide plate 15 is moved from the OFF position to the ON position, the operation member 17a is urged to be pivoted by the protrusion 15a of the slide plate 15, so that the interlock switch 17 is turned on and that the power source circuit C is brought to the connecting state. On the other hand, when the slide plate 15 is moved from the ON position to the OFF position, the operation member 17a is urged to be pivoted in an opposite direction by the protrusion 15a of the slide plate 15, so that the interlock switch 17 is turned off and that the power source circuit C is brought to the disconnecting state.

Thus, the open and close operation of the charging plug insertion opening 13 as well as the operation for turning on and off of the interlock switch 17 can be performed by the sliding movement of the slide plate 15. The sliding movement of the slide plate 15 is performed by the operator by means of an operation key 20.

Figure 5:
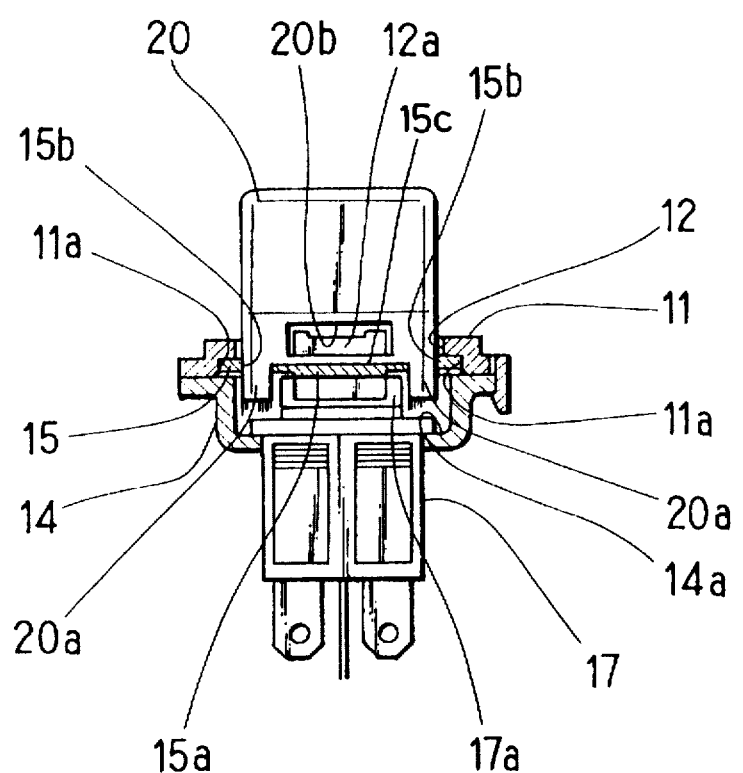
FIG. 5 is a sectional view taken along line V—V in FIG. 2.

The operation key 20 has a substantially flat plate-like configuration and has one end formed with a pair of bifurcated legs 20a as shown in FIG. 5. A substantially rectangular lock opening 20b is formed in the operation key 20 throughout the thickness thereof at the central portion adjacent the legs 20a.

Figure 6A:
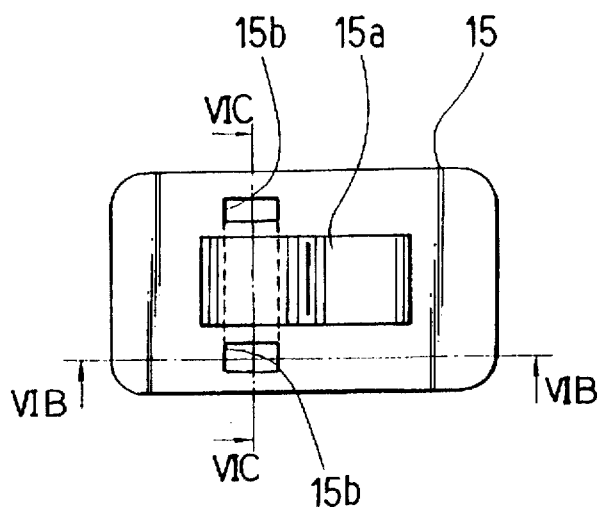
FIG. 6(A) is a rear view of a slide plate of the battery charging device.
Figure 6C:
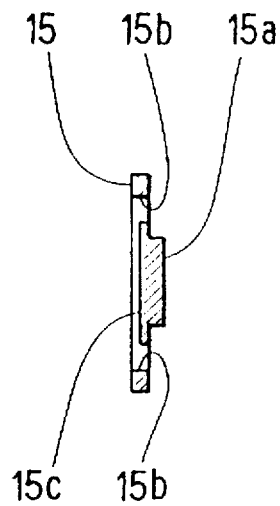
FIG. 6(C) is a front view of the slide plate.
Figure 6B:
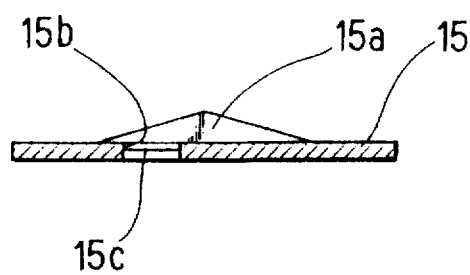
FIG. 6(B) is a sectional view taken along line VIB—VIB in FIG. 6(A)
Figure 6D:
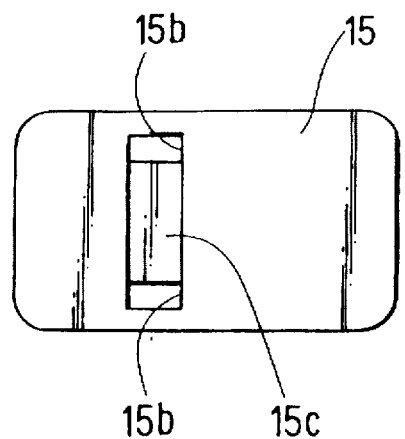
FIG. 6(D) is a sectional view taken along line VID—VID in FIG. 6(A)
Figure 7:
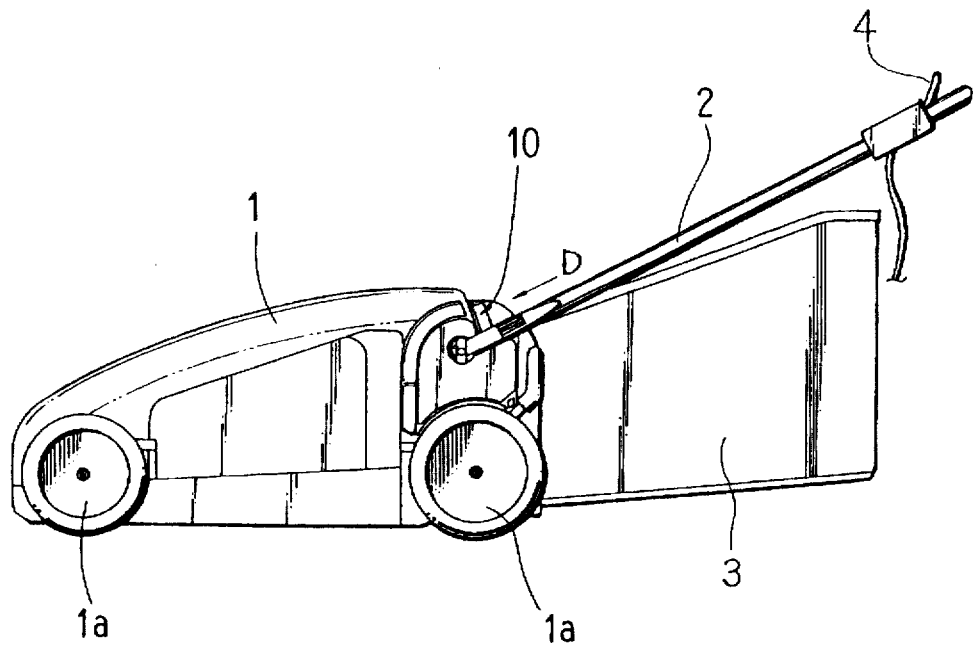
FIG. 7 is a side view of a lawn mower incorporating the battery charging device.

As shown in FIG. 6(C), a stepped portion 15c having a configuration substantially conforming to a section of the operation key 20 is formed on the inner side of the slide plate 15 and has an outer surface which is positioned inwardly of the outer surface of the slide plate 15 by a small distance. A pair of operation key engaging holes 15b are formed throughout the thickness of the stepped portion 15c and are positioned on both ends of the stepped portion 15c.

When the slide plate 15 is in the OFF position, the operation key engaging holes 15b are positioned to confront the left side part of the operation key insertion opening 12 where the lock protrusion 12a does not exist as shown in FIG. 2. On the other hand, when the slide plate 15 is in the ON position, the operation key engaging holes 15b are positioned on both lateral sides of the lock protrusion 12a as shown in FIG. 4.

Thus, only when the slide plate 15 is in the OFF position, the operation key 20 can be connected to the slide plate 15 by inserting the legs 20a into the corresponding operation key engaging holes 15b in a direction perpendicular to the sliding direction of the slide plate 15. With the operation key 20 thus connected to the slide plate 15, the operator can move the slide plate 15 by means of the operation key 20.

When the slide plate 15 is moved from the OFF position to the ON position, the lock opening 20b receives the lock protrusion 12a, so that the operation key 20 cannot be removed from the slide plate 15 even if the operation key 20 is pulled by the operator. Thus, the operation key 20 is locked to the slide plate 15.

As shown in FIGS. 2 and 4, indications "ON" and "OFF" are marked on the outer surface of the front plate 11 for indicating the position of the slide plate 15. When the operation key 20 is in a position of the indication "ON", the slide plate 15 is in the ON position. On the other hand, when the operation key 20 is in a position of the indication "OFF", the slide plate 15 is in the OFF position. Therefore, the operator can visually and reliably recognize the position of the slide plate 15.

Figure 8:
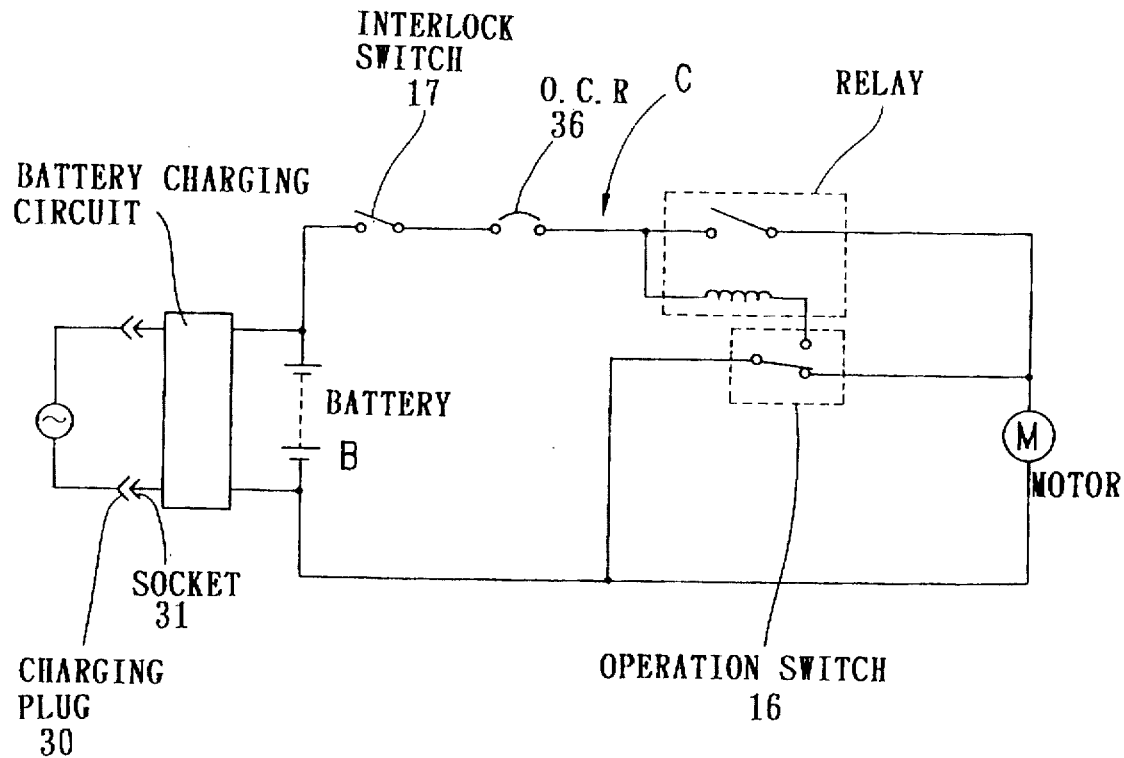
FIG. 8 is a circuit configuration of a power source circuit of the battery charging device.

The power source circuit C having the interlock switch 17 provided therein will now be explained with reference to FIG. 8. The power source circuit C itself is a conventional circuit, and therefore, the explanation will be made in brief.

The power source circuit C includes a socket 31 which is adapted to be connected to the charging plug 30. The socket 31 is mounted on the holder plate 14 in a position confronting the charging plug insertion opening 13 (see FIG. 1).

The power source circuit C also includes an overcurrent relay (O.C.R.) 36 and a reset button 36a for resetting the overcurrent relay 36. The reset button 36a is mounted on the front plate 11 and is positioned on the right side part of the front plate 11 as shown in FIG. 2. Other than these elements, a voltmeter 35 for indicating the voltage of a battery B is mounted on the front plate 11 as shown in FIGS. 1 and 2. For illustration purpose, the voltmeter 35 is omitted from the power source circuit C shown in FIG. 8.

With the power source circuit C, when the charging plug 30 is connected to the socket 31, the battery B can be charged to the predetermined voltage by means of a charging circuit. The voltage of the battery B is indicated by the voltmeter 35, so that the operator can recognize the voltage of the battery B. With the interlock switch 17 turned on, the motor M can be started to rotate the rotary cutter when the operation switch 16 is turned on through operation of the operation lever 4. On the other hand, with the interlock switch 17 turned off, since the power source circuit C is held in the disconnecting state even if the operation switch 16 is turned on, the motor M may not be started.

As described above, with the battery charging device 10 of this embodiment, during the charging operation of the battery B or when the lawn mower is not used and is stored in a storing place, the power source circuit C is held in the disconnecting state. Thus, when the slide plate 15 is moved from the ON position to the OFF position, the charging plug insertion opening 13 is opened, so that the charging plug 30 can be connected to the socket 31 for charging the battery B. With the charging plug 30 thus connected to the socket 31, the slide plate 15 cannot be moved to the ON position, so that the off state (interlock state) of the interlock switch 17 is maintained. Therefore, the motor M may not be started even if the operation lever 4 has been actuated, and any malfunction during the charging operation can be reliably prevented.

In addition, when the operation key 20 is removed from the slide plate 15 with the slide plate 15 being positioned in the OFF position, it is not possible to move the slide plate 15, so that the power source circuit C can be maintained in the disconnecting state. Therefore, malfunction may not be caused when the lawn mower is stored.

Further, when the operation key 20 is removed from the slide plate 15 with the power source circuit C in the disconnecting state, the operation key engaging holes 15b may be exposed to the outside through the operation key insertion opening 12. However, since the operation key insertion opening 12 is substantially closed by the slide plate 15, there is little possibility that any external materials or dust enter the interior of the battery charging device 10, so that improper operation of the interlock switch 17 can be prevented.

Furthermore, it is not possible for a child or any other person to accidentally insert a bar-like member into the operation key insertion opening 12, so that the battery charging device 10 can be prevented from malfunction during the charging operation or when the lawn mower is stored.

In order to operate the lawn mower after completion of the charging operation, the operator connects the operation key 20 to the slide plate 15 by inserting the legs 20a into the corresponding operation key engaging holes 15b of the slide plate 15. With the operation key 20 thus connected to the slide plate 15, the slide plate 15 can be moved to the ON position.

As the slide plate 15 is moved to the ON position, the protrusion 15a is moved in the same direction, so that the interlock switch 17 is turned on and the power source circuit C is brought to the connecting state (interlock releasing state).

Further, as the slide plate 15 is moved to the ON position, the lock opening 20b of the operation key 20 receives the lock protrusion 12a of the front plate 11, so that the operation key 20 is prevented from being removed in the direction opposite to the inserting direction of the legs 20a. Thus, when the power source circuit C is brought to the connecting state with the slide plate 15 in the ON position, removal of the operation key 20 is reliably prevented through insertion of the lock protrusion 12a into the lock opening 20b. This means that the connecting state of the power source circuit C can be reliably maintained. Therefore, with the lawn mower of this embodiment, the power source circuit C may not be accidentally brought to the disconnecting state due to removal of the operation key 20 even if vibrations of great amplitude have been produced in the lawn mower. Thus, the lawn mower excels in operability.

The above embodiment may be modified in various manners. For example, although, in the above embodiment, the operation key engaging holes 15b are formed as through holes, the operation key engaging holes 15b may be replaced by recesses each having a bottom. With this modification, the malfunction of the battery charging device 10 can be further reliably prevented, and dust may be further reliably prevented from entering the interior of the battery charging device 10.

In addition, although the operation key 20 is connected to the slide plate 15 by inserting the legs 20a into the slide plate 15, the operation key 20 may be connected to the slide plate 15 by any other means. Thus, various connecting means can be incorporated as far as the operation key 20 can be connected and removed when the slide plate 15 is in the ON position and as far as the operation key 20 can be prevented from being removed when the slide plate 15 is in the ON position.

Further, in order to prevent the operation key 20 from being removed from the slide plate 15, the above embodiment may be modified such that the front plate 11 includes a lock opening and the operation key 20 includes a lock protrusion.

A second embodiment of the present invention will now be explained with reference to FIGS. 9 to 11. As in the first embodiment, a battery charging device 40 of this embodiment is mounted on the rear upper portion of the body 1 of the lawn mower 1 (not shown in FIGS. 9 to 11).

The battery charging device 40 of this embodiment includes a holder plate 41 and a front plate 42 which cooperate to form an operation panel. A slide plate 43 is slidably movable along the front plate 42. The front plate 42 includes an operation key insertion opening 42a formed therein. The slide plate 43 includes a greater thickness part 43a which protrudes into the operation key insertion opening 42a, so that the slide plate 43 can be moved in the right and left directions as viewed in FIGS. 9 and 10 within a predetermined range which is equal to a movable range of the greater thickness part 43a within the operation key insertion opening 42a.

When the slide plate 43 is moved leftward from an ON position to an OFF position, an operation protrusion 43b formed with the inner surface of the slide plate 43 urges an operation knob 44a of an interlock switch 44 to pivot from an ON position to an OFF position, so that the interlock switch 44 is turned off. Therefore, the power source circuit C is brought from the connecting state to the disconnecting state, and the lawn mower is prevented from being operated.

In addition, as the slide plate 43 is moved from the ON position to the OFF position, the right side end of the slide plate 43 is moved away from a position confronting a charging socket 45. Here, as in the first embodiment, the interlock switch 44 is mounted on the holder plate 41 with its operation knob 44a directed inwardly toward the slide plate 43. Further, as in the first embodiment, the socket 45 is mounted on the holder plate 41.

Figure 9:
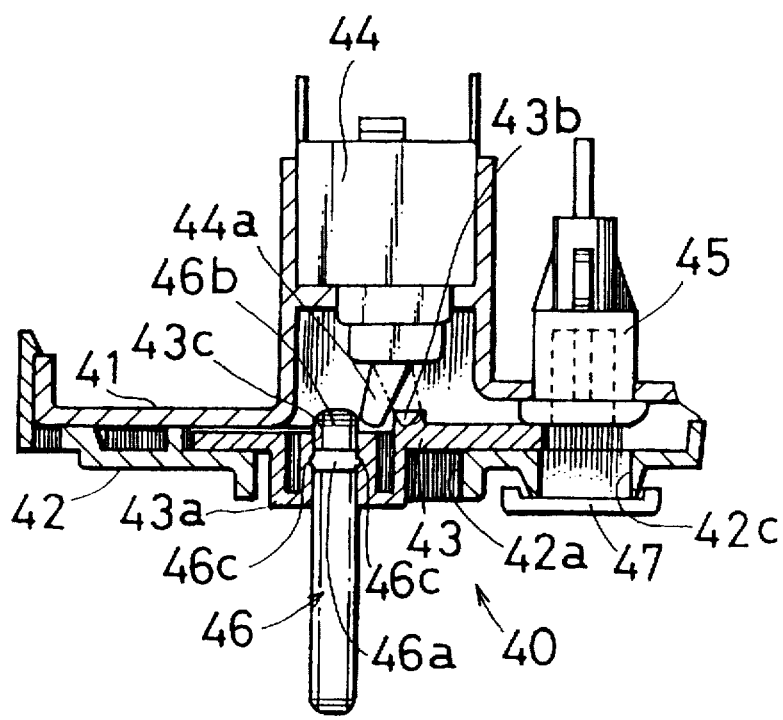
FIG. 9 is a horizontal sectional view of the essential parts of a battery charging device in a disconnecting state according to a second embodiment of the present invention.
Figure 10:
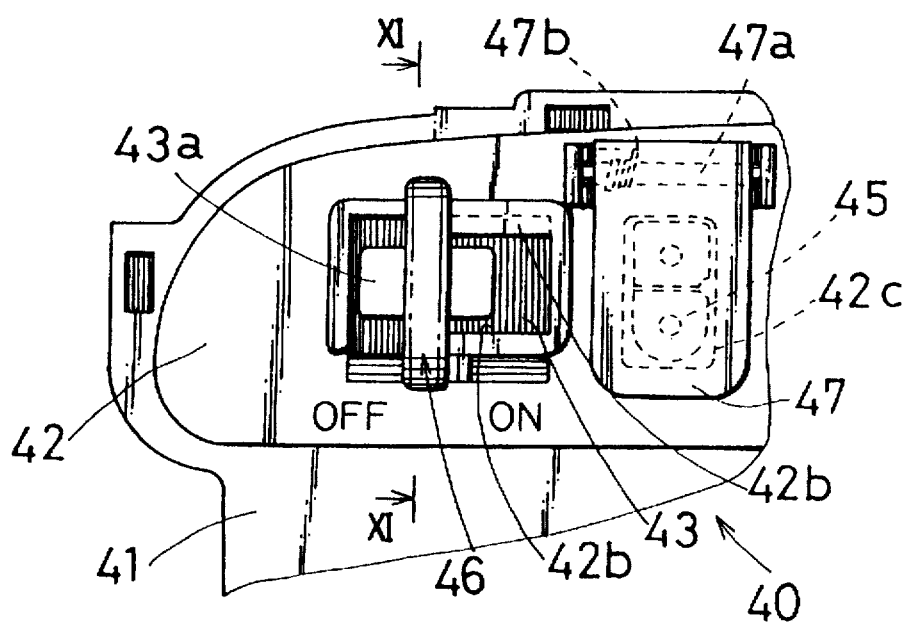
FIG. 10 is a front view of FIG. 9.

As will be best seen from FIG. 9, the greater thickness part 43a of the slide plate 43 has bifurcated ends, so that an operation key 46 is connected to the greater thickness part 43a in such a manner that the operation key 46 is inserted between the bifurcated ends of the greater thickness part 43a.

Figure 11:
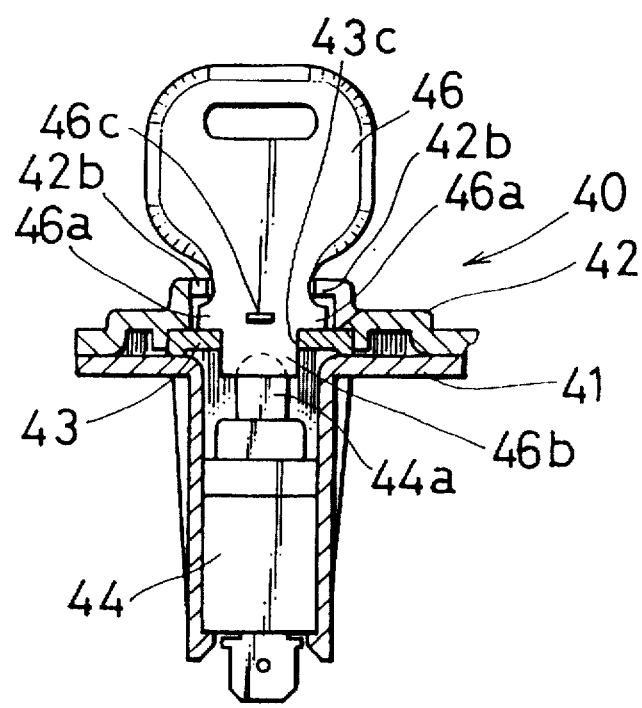
FIG. 11 is a sectional view taken along line XI—XI in FIG. 10.

As shown in FIG. 11, the operation key 46 has a flat plate-like configuration and includes a pair of tab portions 46a extending laterally in a widthwise direction, a leg 46b forming an insertion end, and a pair of small protrusions 46c extending in a direction of thickness of the operation key 46.

As shown in FIG. 9, in a mounting state of the operation key 46, the leg 46b of the operation key 46 is inserted into an insertion hole 43c formed in the slide plate 43, and the leg 46b partly extends inside of the slide plate 43. When the operator moves the slide plate 43 from the OFF position shown in FIG. 9 to the ON position with the operation key 46 grasped with his hand, the operation knob 44a of the interlock switch 44 is urged to be pivoted from the OFF position to the ON position as indicated by chain lines by the extended part of the leg 46, so that the interlock switch 44 is turned on. Thus, the power source circuit C is brought to the connecting state, so that the lawn mower can be operated.

With this embodiment, since the operation knob 44a is pivoted from the OFF position to the ON position by the leg 46b of the operation key 46, the operation knob 44a of the interlock switch 44 may not be pivoted toward the ON position when the slide plate 43 is moved toward the ON position without connecting the operation key 46 to the slide plate 43. Thus, the interlock switch 44 may not be turned on, so that the power source circuit C is maintained in the disconnecting state and that the lawn mower is reliably prevented from malfunction.

In addition, during the operation of inserting the operation key 46 into the slide plate 43, the distance between the bifurcated ends of the greater thickness part 43a of the slide plate 43 is expanded to some extent by the small protrusions 46c protruding in the direction of thickness of the operation key 46. Therefore, the operation key 46 is prevented from being accidentally removed from the slide plate 43.

The operation key insertion hole 42a of the front plate 42 includes a pair of guide edges 42b disposed on both lateral sides of the operation key insertion hole 42a and protruding toward each other. Each of the guide edges 42b has a predetermined width and is formed only in an area of the right side half or an ON side area of the operation key insertion hole 42. With the provision of the guide edges 42b, the operation key 46 can be connected and removed only when the slide plate 43 is in the OFF position.

As the operator moves the slide plate 43 toward the ON position with the operation key 46 grasped with his hand, the tabs 46a of the operation key 46 enter the inside of the corresponding guide edges 42b, so that the operation key 46 cannot be removed from the slide plate 43 even if the operator pulls the operation key 46 in a direction opposite to the connecting direction. When the slide plate 43 is in the ON position, the front side of the socket 45 is closed by a right side end of the slide plate A charging plug insertion opening 42c is formed in the front plate 42 and confronts the front side of the socket 45.

A lid 47 serves to open and close the charging plug insertion opening 42c. As shown in FIG. 10, the lid 47 is pivotally mounted on the front plate 42 by means of a support pin 47a and is normally biased toward a close position by a torsion spring 47b. In order to open the charging plug insertion opening 42c, the operator pivots the lid 47 toward an open position against the force of the torsion spring 47b. Thus, with the slide plate 43 being in the OFF position, the operator can connect a charging plug (not shown) to the socket 45 through the charging plug insertion opening 42c.

The battery charging device 40 of the second embodiment may provide substantially the same function and effects as the first embodiment. Thus, when the operator moves the slide plate 43 from the ON position to the OFF position with the operation key 46 grasped with his hand, the interlock switch 44 is turned off by the operation protrusion 43b of the slide plater 43, so that the power source circuit C is disconnected. At the same time, the slide plate 43 is moved away from the position confronting the socket 45. Therefore, by opening the lid 47, the operator can connect the charging plug to the socket 45 for charging the battery B. Since the slide plate 43 cannot be moved from the OFF position to the ON position when the charging plug is connected to the socket 45, the disconnecting state of the power source circuit C can be reliably maintained during the charging operation. Therefore, the lawn mower is reliably prevented from malfunction.

In addition, even if the operation key 46 has been removed from the slide plate 43 during the charging operation, the slide plate 43 cannot be moved because of connection of the charging plug to the socket 45. The disconnecting state of the power source circuit C can be reliably maintained also in this respect.

Further, when the operation key 46 is removed from the slide plate 43 during the charging operation or when the lawn mower is stored, the operation key insertion opening 42a is substantially closed by the slide plate 43 although the insertion hole 43c is opened to the outside. Therefore, external materials or the like are substantially prevented from entering the interior of the battery charging device 40.

Meanwhile, the operation knob 44a of the interlock switch 44 is pivoted from the OFF position to the ON position by the leg 46b of the operation key 46. Therefore, the interlock switch 44 may not be turned on without connecting the operation key 46 to the slide plate 43 even if the slide plate 43 could be moved to the ON position. Therefore, the disconnecting state of the power source circuit C can be reliably maintained. This feature is not provided by the first embodiment, and with this feature, the lawn mower can be further reliably prevented from malfunction.

When the operator moves the slide plate 43 from the ON position to the OFF position with the operation key 46 grasped with his hand, the tabs 46a enter the inside of the guide edges 42b, so that the operation key 46 is prevented from being accidentally removed from the slide plate 43 during the operation of the lawn mower.

The second embodiment is also different from the first embodiment in the provision of the lid 47 of the charging plug insertion opening 42c. With the provision of the lid 47, when the lawn mower is not operated and is stored or when the slide plate 43 is in the OFF position without connecting the charging plug to the socket 45, the charging plug insertion opening 42c is closed by the lid 47, so that the socket 45 may not be exposed to the outside. Therefore, the socket 45 may be protected and any external materials may be reliably prevented from entering the interior of the battery charging device 40.

Although the first and second embodiments are described in connection with the battery charging devices of the lawn mower, these embodiments can be broadly applied to other battery driven tools.

While the invention has been described with reference to preferred embodiments thereof, it is to be understood that modifications or variations may be easily made without departing from the spirit of this invention which is defined by the appended claims.

What is claimed is:

1. A battery charging device for use with a battery driven tool having a power source circuit and an interlock switch provided in the power source circuit, the battery charging device comprising:

an operation panel having an operation key insertion opening and a charging plug insertion opening formed therein;

a slide plate movable relative to said operation panel between an ON position for turning on the interlock switch and for substantially closing said charging plug insertion opening, and an OFF position for turning off the interlock switch and for substantially opening said charging plug insertion opening, said slide plate having a part to act on the interlock switch for turning on and off the interlock switch;

an operation key having an operating end;

a connecting mechanism for engaging the operating end of the operation key with the slide plate; and said connecting mechanism being permitted to engage the operation key operating end only when the slide plate is in the OFF position.

2. The battery charging device as defined in claim 1 further including lock means for preventing said operation key from being removed from said slide plate when said slide plate is moved from said OFF position to said ON position with said operation key being connected to said slide plate.

3. The battery charging device as defined in claim 1 wherein said operation panel includes a front plate having said operation key insertion opening and said charging plug insertion opening, and wherein said slide plate is slidably movable along an inner surface of said front plate.

4. The battery charging device as defined in claim 3 wherein said connecting mechanism includes an engaging hole formed in said slide plate for engaging one end of said operation key in a direction perpendicular to a sliding direction of said slide plate.

5. The battery charging device as defined in claim 4 wherein said one end of said operation key includes a leg extending inwardly of said slide plate when said one end is in engagement with said engaging hole, so that said leg is operable to turn on the interlock switch.

6. The battery charging device as defined in claim 2 wherein said lock means includes a lock opening formed in said operation key and a lock protrusion formed on said operation panel, so that said lock protrusion is received by said lock opening when said slide plate is moved from said OFF position to said ON position.

7. The battery charging device as defined in claim 2 wherein said lock means includes a lock protrusion formed on said operation key and a guide edge formed on said operation panel, so that said lock protrusion is positioned between said operation panel and said slide plate when said slide plate is moved from said OFF position to said ON position.

8. The battery charging device as defined in claim 1 wherein said operation panel includes a lid for normally closing said charging plug insertion opening.

9. A battery charging device for use with a battery driven tool having a power source circuit and an interlock switch provided in the power source circuit, the battery charging device comprising:

- an operation panel having an operation key insertion opening and a charging plug insertion opening formed thereon;
- a slide plate movable relative to said operation panel between an ON position for turning on the interlock switch and for substantially closing said charging plug insertion opening, and an OFF position for turning the interlock switch off and for substantially opening said charging plug insertion opening; and
- an operation key for connecting to said slide plate by a connecting mechanism, said operation key having a part to act on the interlock switch for turning the interlock switch on and off;

said operation key being permitted to be connected to said slide plate through said connecting mechanism only when said slide plate is in the OFF position.

10. The battery charging device as defined in claim 9 wherein said operation panel includes a front plate having said operation key insertion opening and said charging plug insertion opening, and wherein said slide plate is slidably movable along an inner surface of said front plate.

11. The battery charging device as defined in claim 10 wherein said connecting mechanism includes an engaging hole formed in said slide plate for engaging one end of said operation key in a direction perpendicular to a sliding direction of said plate.

12. The battery charging device as defined in claim 11 wherein said one end of said operation key includes a leg extending inwardly of said slide plate when said one end is in engagement with said engaging hole, so that said leg is operable to turn on the interlock switch.

* * * * *